Aug. 19, 1941.  E. F. LOWEKE  2,253,240

FLUID PRESSURE SYSTEM

Filed Sept. 10, 1938  2 Sheets-Sheet 1

INVENTOR.
ERWIN F. LOWEKE
BY
ATTORNEY.

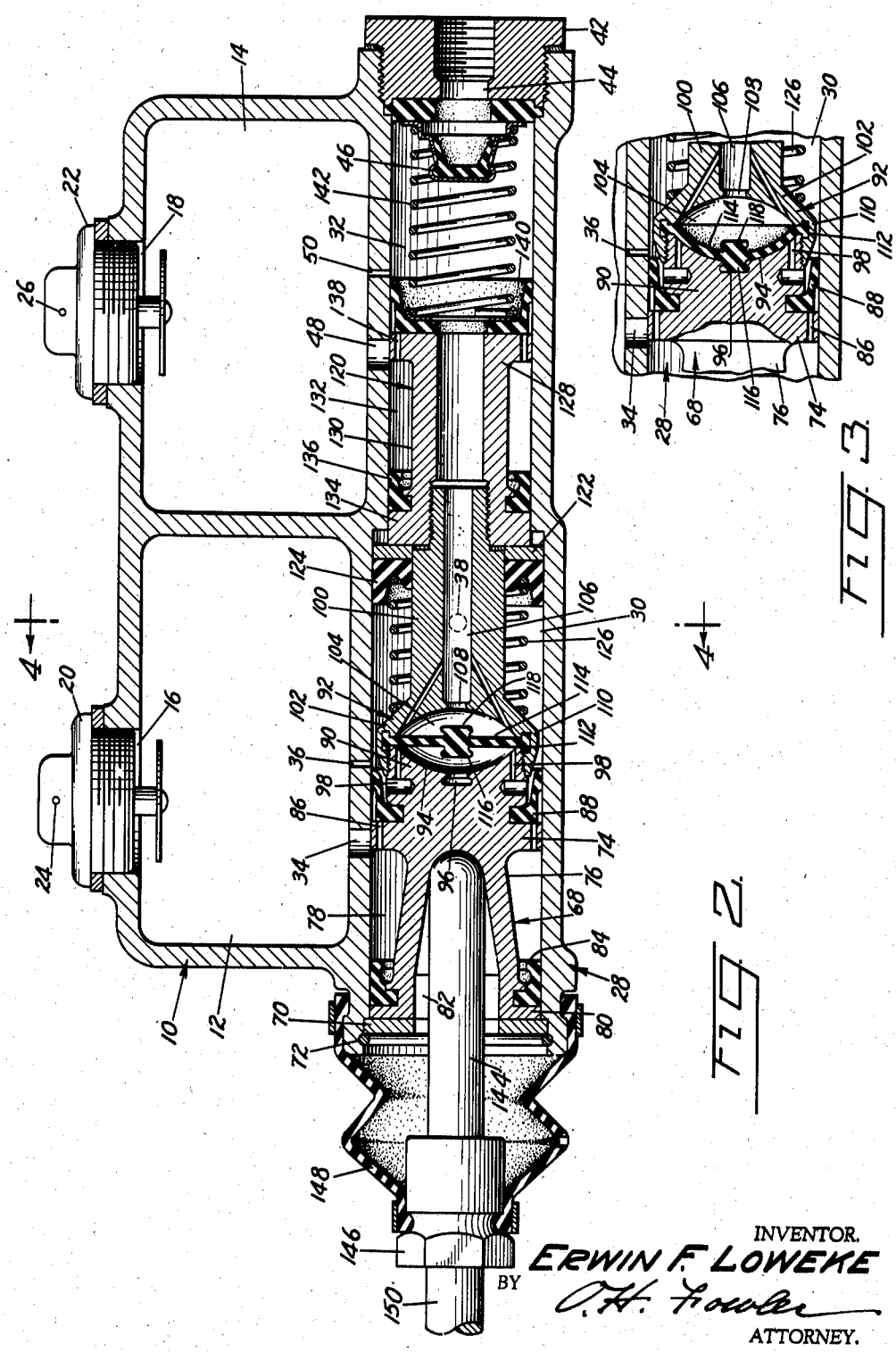

Patented Aug. 19, 1941

2,253,240

UNITED STATES PATENT OFFICE 2,253,240

FLUID PRESSURE SYSTEM

Erwin F. Loweke, Detroit, Mich., assignor to Hydraulic Brake Company, Detroit, Mich., a corporation of California Application September 10, 1938, Serial No. 229,365

4 Claims. (Cl. 60—54.5)

This invention relates to fluid pressure braking systems, and more particularly to duplex braking systems for motor vehicles.

An object of the invention is to provide a fluid pressure braking system for a motor vehicle including independent fluid pressure braking systems, one for actuating the brakes associated with the front wheels of a vehicle, and another for actuating the brakes associated with the rear wheels of the vehicle.

Another object of the invention is to provide a duplex fluid pressure braking system including means compensating for a differential of pressure in the systems.

Yet another object of the invention is to provide a duplex fluid pressure braking system including means for actuating both systems in unison, means compensating for a differential of pressure in the systems, and means for maintaining one of the systems operative in the event of failure of the other system.

A feature of the invention is a cylinder and a piston movable in the cylinder having spaced heads, and a chamber between the heads having therein a diaphragm for equalizing the pressure created in the cylinder forward of the respective heads.

Other objects and features of the invention will appear from the following description taken in connection with the drawings forming a part of this specification, and in which—

Fig. 2 is a vertical sectional view of the fluid pressure producing device;

Fig. 3 is a fragmentary view illustrating the diaphragm; and

Figures 1, 4:
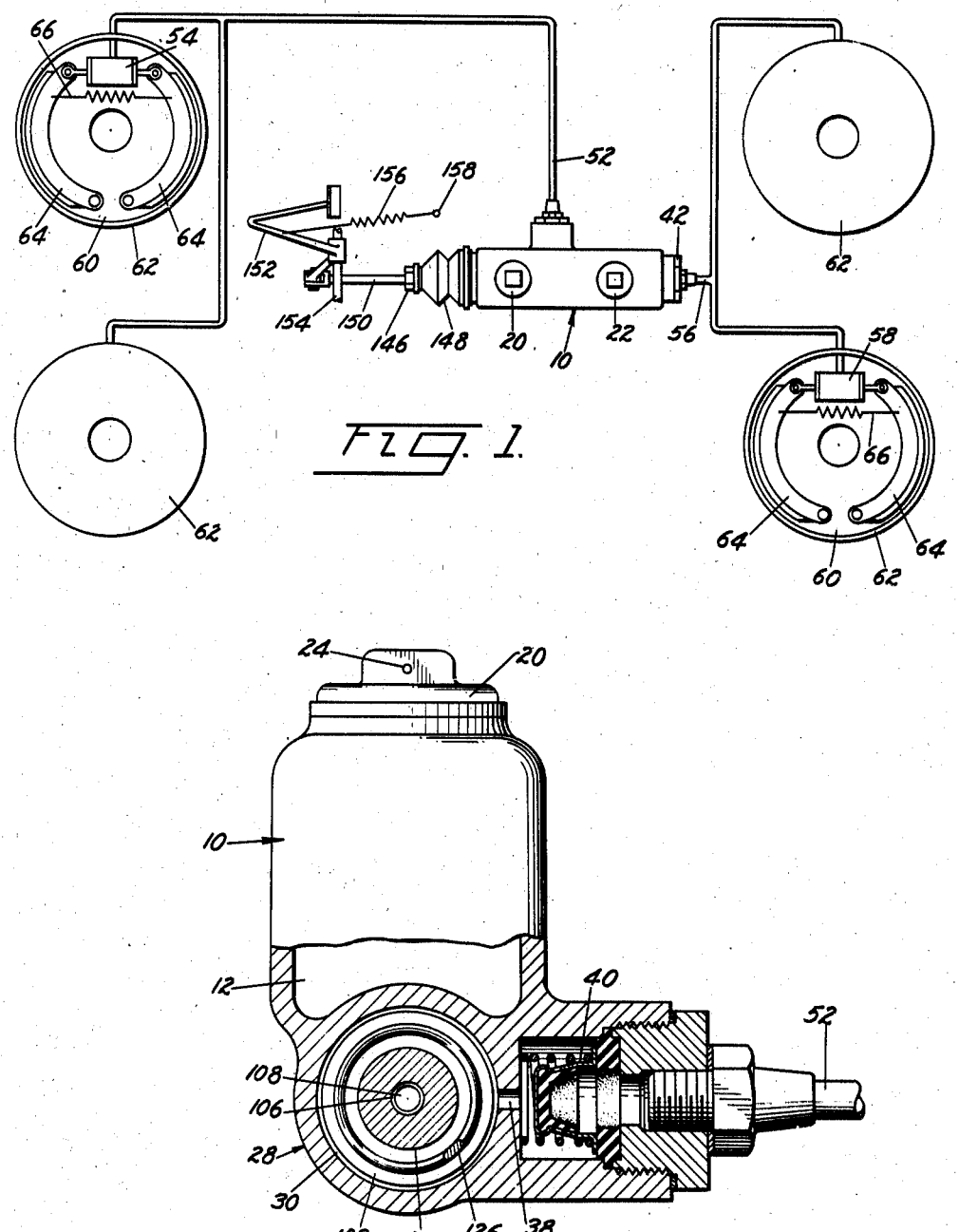
Fig. 1 is a diagrammatic view of a fluid pressure braking system embodying the invention.
Fig. 4 is an end elevation partly in section.

Referring to the drawings for more specific details of the invention, 10 represents a fluid pressure producing device including substantially corresponding reservoirs 12 and 14 each having a filling opening 16 and 18 normally closed as by a plug 20 and 22 provided with openings 24 and 26 therethrough for venting the reservoirs to the atmosphere.

A cylinder 28 at the base of the reservoir includes a large chamber 30 and a relatively small chamber 32 arranged forward of the large chamber concentrically thereto and in direct communication therewith. The large chamber is open at its rear end, and arranged in its wall are ports 34 and 36 providing communications between the large chamber and the reservoir. The large chamber also has a discharge port 38 controlled as by a two-way valve 40. The small chamber is closed as by a head 42 provided with a discharge port 44 controlled as by a two-way valve 46, and arranged in the wall of the small chamber are ports 48 and 50 providing communications between the small chamber and the reservoir.

A fluid pressure delivery pipe or conduit 52 connected to the discharge port 38 has branches connected respectively to fluid pressure actuated motors 54 arranged for the actuation of a pair of brakes, and, correspondingly, a fluid pressure delivery pipe or conduit 56 connected to the discharge port 44 has branches connected respectively to fluid pressure actuated motors 58 arranged for the actuation of another pair of brakes. As shown, the fluid pressure actuated motors 54 and 58 are arranged in pairs, one pair for actuating the brakes associated with the front wheels of the vehicle and another pair for actuating the brakes associated with the rear wheels of the vehicle.

The brakes are of a conventional type including a fixed support or backing plate 60 adapted to be secured to an axle or to an axle housing, a rotatable drum 62 associated with the backing plate adapted to be secured to a wheel, a pair of corresponding interchangeable friction elements or shoes 64 pivoted on the backing plate for co-operation with the drum, a retractile spring 66 connecting the shoes, and a motor corresponding to the motors 54 and 58 mounted on the backing plate and connected to the shoes for actuating the shoes into engagement with the drum against the resistance of the retractile spring.

A piston 68 reciprocable in the chamber 30 is held against displacement by a washer 70 seated on an annular shoulder in the wall of the chamber adjacent the open end thereof, and secured in place by a retaining ring 72 seated in a groove in the wall of the chamber. The piston 68 includes a head 74, a reduced body portion 76 providing in conjunction with the wall of the chamber 30 an annular chamber 78 communicating with the reservoir 12 by way of the port 38, and a skirt 80 having therein a socket 82 extending well into the body of the piston. The skirt carries a sealing cup 84 inhibiting the seepage of fluid from the annular chamber past the piston, and the head has a plurality of passages 86 therethrough providing comunications between the annular chamber 78 and that portion of the chamber 30 forward of the piston, and a sealing cup 88 supported on the head controls the passages.

A concentric extension 90 on the head of the piston supports an equalizing chamber 92. As shown, the extension is provided in its face with a semi-spherical concavity 94 communicating at its bottom with a strangulated recess 96, and a plurality of passages 98 through the extension providing communications between the concavity 94 and the chamber 30 of the cylinder.

A force transmitting rod 100 has an enlarged end 102 provided with a semi-spherical concavity 104 corresponding to the concavity in the face of the extension 90. The rod has an axial bore 106 communicating with the concavity 104 at its bottom, and the communication is strangulated as indicated at 108. The rod also has a plurality of passages therethrough providing communications between the concavity 104 and the axial bore 106. A flange 110 on the enlarged head 102 of the rod 100 is attached to the extension 90 on the head of the piston 68 so as to support the rod concentrically of the piston with the concavity 104 in the head of the rod in oppositely disposed relation to the concavity 94 in the extension 90.

The flange 110 on the head of the rod has a groove 112, and a flexible diaphragm 114 has a rim seated in the groove and secured against displacement by the oppositely disposed rims of the concavities 94 and 104. As shown, the diaphragm has arranged centrally thereon oppositely disposed flexible buttons 116 and 118 adapted to enter respectively the strangulated recess 96 and the strangulated communication 108 upon an excessive differential of pressure in the concavities 94 and 104 so that the diaphragm may be retained in flexed position against the wall of the concavity in which loss of pressure occurs.

A piston 120 reciprocable in the small chamber 32 is attached to the force transmitting rod 100, and a washer 122 sleeved on the rod supports a sealing cup 124 retained against displacement by a spring 126 interposed between the cup and the enlarged head 102 of the rod. This cup inhibits seepage of fluid from the chamber 30 into the chamber 32. The piston 120 has an axial bore communicating with the passage 106 in the rod 100. The piston includes a head 128, a reduced body portion 130 providing in conjunction with the wall of the chamber 32 an annular chamber 132 communicating with the reservoir 14 by way of the port 44, and a skirt 134 supporting a sealing cup 136 for inhibiting seepage of fluid from the annular chamber 132 past the skirt 134 of the piston.

The head of the piston 120 has a plurality of passages 138 therethrough providing communications between the annular chamber 132 and that portion of the chamber 32 forward of the piston. A sealing cup 140 seated on the head of the piston controls the passages 138, and a spring 142 interposed between the cup and the two-way valve 46 serves to retain the cup and valve against displacement and also to return the piston to retracted position.

A thrust pin 144 has one of its ends seated in the socket 82 in the piston 68 and its other end attached to a coupling 146, and the coupling is connected as by a flexible boot 148 to the open end of the cylinder for the exclusion of dust from the cylinder. A rod 150 has one of its ends attached to the coupling 146 and its other end is pivotally connected to a foot pedal lever 152 rockable on the shaft 154 and connected by a retractile spring 156 to a fixed support 158.

In a normal operation of the system, upon depressing the foot pedal lever 152, force is transmitted from the lever through the rod 150 and the thrust pin 144 to the piston 68, resulting in movement of the piston 68 on its compression stroke and also advancing the piston 120 connected to the piston 68. During the initial movement of the piston 68, the sealing cup 88 on the head thereof closes the port 36, and, thereafter, as the piston advances, pressure is imposed on the fluid in that portion of the chamber 30 forward of the piston. This results in displacement of fluid from the chamber 30 through the port 38, past the two-way valve 40, and through the fluid pressure delivery pipe or conduit 52 into the fluid pressure actuated motors 54, causing energization of the motors. This results in movement of the shoes 64 into engagement with the drum 62 against the resistance of the retractile spring 66. Correspondingly, during the initial movement of the piston 120, the cup 140 on the head thereof closes the port 50, and, thereafter, as the piston advances, pressure is imposed on the fluid in that portion of the chamber 32 forward of the piston, resulting in displacing fluid from the chamber 32, past the two-way valve 46, through the discharge port 44 and fluid pressure delivery pipe or conduit 56 into the fluid pressure actuated motors 58, causing energization of the motors 58, and resulting in movement of the shoes 64 into engagement with the drum 62 against the resistance of the retractile springs 66.

Under normal conditions, variations of pressure may be produced in the respective chambers 30 and 32, due to a differential in the adjustment of the respective pairs of brakes associated with the front and rear wheels of the vehicle, and in order to compensate for this differential of pressure, so that both pairs of brakes may be applied with equal effectiveness, a compensating means is arranged intermediate the pistons 68 and 120.

This compensating means includes opposed concavities 94 and 104, each having in its bottom a strangulated opening 96 and 108. The concavity 94 communicates with the chamber 30 as by passages 98, and the concavity 104 communicates with the chamber 32 as by suitable passages and the bore 106 through the rod 100 and the axial bore of the piston 120. A flexible diaphragm 114 clamped between the rims of the concavities may be flexed to compensate for any variation of pressure in the concavities, and the diaphragm has oppositely disposed flexible buttons 116 and 118 adapted, upon an excessive differential of pressure in the concavities, to enter the strangulated opening in the bottom of the concavity in which loss of pressure has occurred, and thus secure the diaphragm against the wall of this cavity.

Upon conclusion of a braking operation and release of the foot pedal lever 152, the lever is returned to its retracted position under the influence of the retractile spring 156. This movement of the lever retracts the rod 150 and the thrust pin 144, and results in release of the pistons, whereupon the spring 142 becomes effective to return the pistons to their retracted position. As the piston 68 returns to its retracted position, a partial vacuum is created in the chamber 30. This results in drawing fluid from the reservoir 12, through the port 34 into the annular chamber 78, thence through the passages 86, past the sealing cup 88, into the chamber 30, completely filling the chamber. Correspondingly, as the piston 120 returns to its retracted position, a partial vacuum is created in the chamber 32, and this results in drawing fluid from the reservoir 14 through the port 48 into the annular chamber 132, thence through the passages 138, past the sealing cup 140, into the chamber 32, completely filling the chamber.

During this period of the operation, fluid is returning to the chambers 30 and 32 from the fluid pressure actuated motors 54 and 58, and the fluid pressure delivery pipes connecting the motors to the chambers 30 and 32, under the influence of the retractile springs connecting the shoes of the respective brakes. Under these conditions, the chambers 30 and 32 receive fluid in excess of their respective capacities, and this excess fluid is displaced from the respective chambers through the ports 36 and 50 into the reservoirs 12 and 14.

In the event of failure of the system for actuating the set of brakes for the front wheels of the vehicle, the piston 68 becomes ineffective for producing pressure, and, accordingly, the diaphragm 114 flexes excessively and the button 116 on the diaphragm enters the strangulated recess 96 and secures the diaphragm against further movement. On subsequent operations, the piston 68 merely serves as a mechanical means for advancing the piston 120. In the event of failure of the system for actuating the set of brakes for the rear wheels, the piston 120 becomes ineffective for producing pressure, and, accordingly, due to a differential of pressures in the systems, the diaphragm is flexed so that the button 118 enters the strangulated opening 108 and secures the diaphragm against further movement.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A fluid pressure equalizer comprising a chamber having opposite openings for admission of fluid to the chamber, a flexible diaphragm dividing the chamber, and oppositely disposed flexible members on the diaphragm adapted to enter and close the openings and to latch therein.

2. A fluid pressure equalizer comprising a chamber having oppositely disposed strangulated openings for admission of fluid to the chamber, a flexible diaphragm dividing the chamber, and oppositely disposed flexible buttons on the diaphragm adapted to interlock with the strangulated openings.

3. A fluid pressure equalizer comprising a chamber having opposed concavities each provided with a strangulated opening for admission of fluid to the chamber, a flexible diaphragm dividing the chamber adapted to flex and lie on the face of either concavity, and oppositely disposed flexible members on the diaphragm adapted to enter and lock in the strangulated openings.

4. A fluid pressure braking system comprising independent fluid pressure producing means connected for simultaneous actuation, a single actuator for both pressure producing means, a fluid pressure-actuated motor connected to each pressure producing means, a braking element connected to each motor, an equalizing chamber including opposed concavities communicating with the respective pressure producing means, each of the concavities having a strangulated opening, a flexible diaphragm separating the concavities, and flexible buttons on the diaphragm adapted to enter and lock in the openings upon creation of an abnormal differential of pressure in the equalizing chamber.

ERWIN F. LOWEKE.